April 5, 1938.   J. P. MARTIN   2,112,992
MIXING MACHINE
Filed Nov. 30, 1936

Inventor
James P. Martin
By Eugene M. Purdy
his Attorney

Patented Apr. 5, 1938

2,112,992

UNITED STATES PATENT OFFICE 2,112,992

MIXING MACHINE

James P. Martin, Lancaster, Pa., assignor to Lancaster Iron Works, Incorporated, Lancaster, Pa., a corporation of Pennsylvania Application November 30, 1936, Serial No. 113,526

5 Claims. (Cl. 259—125)

This invention relates to commercial mixing machines and aims to provide a batch mixer having a mixing chamber so constructed and arranged as to prevent the escape of any appreciable quantities of dust to the surrounding atmosphere.

The abatement of dust in industries involving the quantity handling of granular or pulverulent materials is becoming a matter of increasing importance not only because of the substantial waste represented in the aggregate of material carried off as such dust but more importantly because of the growing recognition of the deleterious effects of such dust upon the health of the employees and, additionally, the increased burden of responsibility placed upon the operators of plants as a consequence thereof. In many instances the particles of material carried by the dust are inherently dangerous to health, while in other cases, as where the material carried in suspension in the air is of a hard and gritty nature, continued breathing of such dust even in minute quantities over a long period of time produces a diseased condition of the lungs called silicosis. Only in recent years has public attention been called to the extremely wide prevalence and high mortality of this occupational disease and have active steps been taken to remedy the condition to which it is attributable.

The dust problem is especially critical in connection with the operation of commercial mixing machines in many manufacturing plants in which the agitation of the finely divided materials is ordinarily accompanied by the discharge of considerable quantities of dust in the vicinity of the mixers.

While this condition has been mitigated to some extent by providing covers for the mixing pans of stationary mixers, this expedient has been only partially successful for, as in the case of those vertical types of mixers in which both the mixing pan and the agitator blades rotate in opposite directions about vertical axes beneath a stationary dome or cover, there is a tendency for substantial amounts of material to be forced out through the clearances between the mixing pan and cover particularly during charging of the mixer when air within the mixing pan is compressed by the incoming batch of material. In the case where this material is of a siliceous or abrasive nature, as in the glass and carborundum industries, the presence of scarcely detectable amounts of this material in the atmosphere is extremely dangerous to the health of the workmen. In other cases, such as in the manufacture of paints, small amounts of certain color ingredients escaping into the air are sufficient to contaminate batches of other colors housed in the same plant with the mixer.

It is the purpose of my invention to overcome the above objections by providing a mixer of the vertical rotary type including a relatively rotatable mixing pan and cover in which the clearance between the cover and mixing pan is sealed so as to effectively prevent the passage of dust from the interior of the pan to the outside, and which seal at the same time affords a loose fit between the relatively rotatable parts to reduce frictional resistance.

The invention has for another object to provide in a mixer of the above character an air-tight seal between the cover and mixing pan which does not depend upon rubbing contact between surface-to-surface parts such as ordinarily results in rapid and excessive wear due to the abrasive action of the particles of material undergoing treatment which penetrate into the bearing surfaces and necessitate frequent replacement of the parts.

More specifically the above objects are accomplished by providing between the relatively rotatable cover and the mixing pan a fluid seal comprising a downwardly projecting circumferential tongue and an upwardly directed channel filled with a viscous fluid into which the tongue projects, the arrangement being such that while the mixing pan rotates the tongue travels in an annular well of fluid. In the preferred form of my invention to avoid contamination of the material in the mixer I provide a relatively narrow clearance between the opposed faces of the cover and mixing pan so as to retard the passage of fluid from the channel into the mixing chamber and additionally provide a packing overlying the joint between the relatively rotatable parts of the mixer upon its interior to block the passage of the fluid from between this joint into the mixer.

Another object of the invention is to provide a mixing machine of the above character having a fluid seal between its relatively movable parts in which the channel containing the sealing medium is provided with overflow means in its outer circumferential wall below the top of its inner circumferential wall to preclude the passage of fluid into the mixing chamber and additionally to warn the workman by escape of the fluid to the outside during replenishing of the supply of sealing fluid, when the proper level of fluid within the channel has been reached.

Further objects and advantages will be apparent from the following detailed description of one preferred embodiment of the invention, reference being had to the annexed sheet of drawings, in which.

Figure 1:
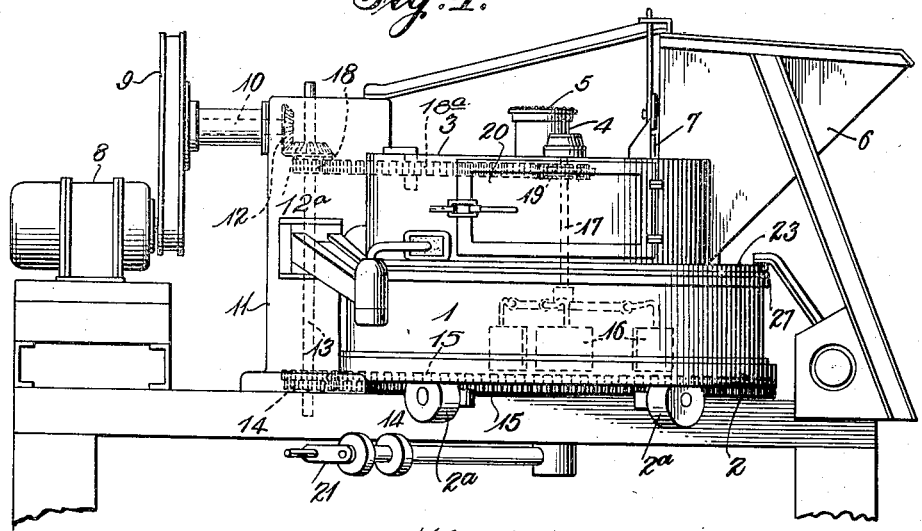
Figure 1 is a view of a commercial mixing machine in side elevation.
Figure 2:
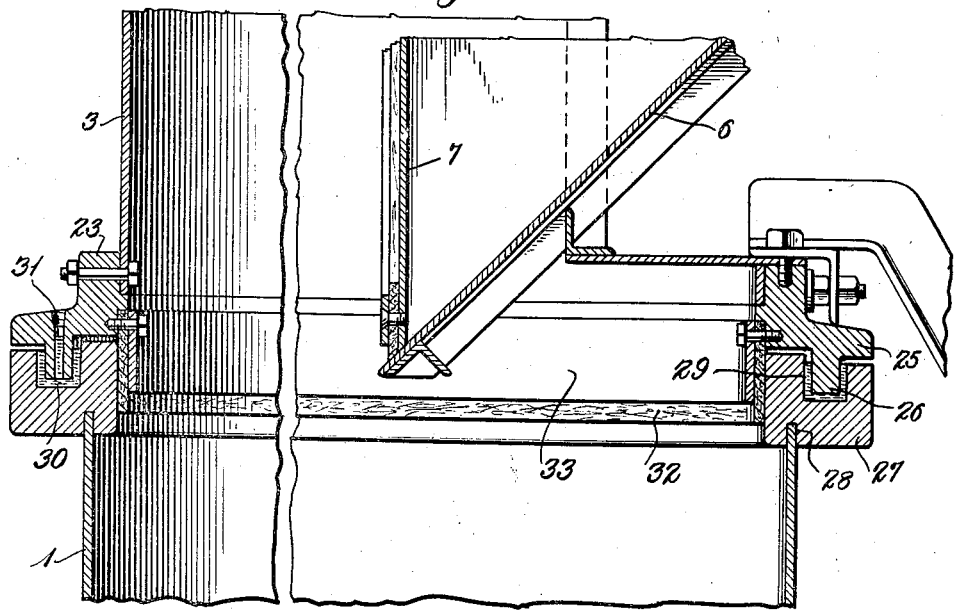
Figure 2 is a contracted cross-sectional view of the fluid seal between the rotary mixing pan and the stationary cover of the mixer of Fig. 1, but on a larger scale.

The mixer shown generally in Fig. 1 is of the vertical rotary type such as has found useful application in many industrial plants for treating large batches of material, such as the ingredients of glass, carborundum and paints. This apparatus consists of an upright cylindrical mixing pan 1 having its lower end surrounded by a guard 2. The mixing pan is supported upon fixedly mounted rollers 2a and is provided with a stationary dome-shaped cover 3 extending over and closing the open top of the mixing pan. Extending up from the top of the cover is a vent stack 4, over the upper end of which is secured a cloth screen to separate the particles of material from the air which is displaced from the interior of the mixer during charging. This cloth is of a mesh such as to exclude practically all dust from passage therethrough. A hopper 6 leading in to one side of the cover is adapted to be placed in and out of communication with the inside of the mixing pan by means of a gate 7. The supply of materials to be mixed will be first deposited in the hopper and when the gate is raised by suitable operating mechanism will be discharged from the hopper into the mixing pan.

The rollers 2a engage a track upon the bottom of the mixing pan and the mixing pan is adapted to be rotated by means of an electric motor 8 which, through gears or a belt transmission enclosed within a housing 9 extending between suitable pulleys, drives a horizontal shaft 10 journaled in a vertical hollow pedestal 11. As indicated by phantom lines in Fig. 1, shaft 10 is connected by bevel gears 12 and 12a to a vertical shaft 13 enclosed within the pedestal, and this vertical shaft 13 is provided with a gear 14 meshing with a ring gear 15 upon the bottom of the mixing pan to rotate the latter. A plurality of stirrers 16 constituting the mixing means are carried upon a vertical spindle 17 and this spindle is operatively connected to the vertical drive shaft 13 through transmission gears 18, 18a and 19 so as to rotate the stirrers in an opposite direction to the direction of rotation of the mixing pan.

A door 20 affords access to the interior of the mixer while a manually operable bottom closure 21 of the type disclosed in the patent of Ludwig and Joseph Eirich, No. 1,663,830, dated March 27, 1928, is provided for removing the mixed batch of material from the bottom of the mixing pan.

In mixers of the general type described above difficulty has been experienced in maintaining a closed joint between the stationary cover and rotatable mixing pan. According to the present invention a ring 23 is circumferentially bolted to the lower side of the cover. This ring is provided with an outwardly extending web 25 so as to increase the width of the lower face of the ring. Upon the lower face of the ring intermediate its width the ring is provided with a continuous annular tongue 26 depending a substantial distance below the lower face of the ring.

Mounted upon the rim of the wall of the mixing pan 1 is a companion ring 27, the lower face of this ring being slotted as indicated at 28, so as to have drive-fitted connection with the upper edge of the mixing pan. The ring 27 is of the same width between its inner and outer circumferential edges as the ring 23 and is provided intermediate such edges with a channel 29 into which the tongue 26 of ring 23 loosely projects without contacting the sidewalls or bottom of the channel.

The channel is adapted to be filled with a viscous sealing medium 30, such as a grease or a heavy oil, so that the fluid penetrates and completely fills the space between the tongue and channel. In order to obstruct the outflow of sealing fluid from the channel, the opposed wide faces of the rings 23 and 27 carried by the cover and mixing pan respectively are relatively closely spaced together, although out of contact with each other throughout their extents.

A vertical passageway 31, interiorly screw-threaded at its upper end to afford a connection with a pressure gun and communicating at its lower end with the channel 29, is provided in the ring 23 for the introduction of grease or oil into the channel. These passageways may be duplicated at suitable intervals circumferentially of the ring. In order to avoid contamination of the contents of the mixer with grease or oil escaping from the channel, the side wall forming the outer circumference of the channel is of less height than the side wall forming its inner circumference so that the tendency of the fluid in the channel will be to overflow toward the exterior of the mixing pan. When the supply of fluid in the channel is being replenished such overflow indicates to the workman that the channel is filled to the proper level. As additional safeguards against the escape of fluid into the mixer, the channel 29 is arranged somewhat closer to the outer circumference of the ring 27 than to its inner circumference so as to increase the path of flow and hence the resistance to travel of the fluid toward the interior of the mixer; and a fibrous packing ring 32 backed by a metal hoop 33 is secured to the ring 23 and disposed so as to overlap the joint between the rings upon the interior of the mixer. While this packing ring will have some utility in preventing the escape of dust from the mixing pan, its principal function is to prevent the ingress of sealing fluid and it is therefore not essential for the packing to make binding frictional contact with the rotating ring 27 which it overlies. The packing 32, while inadequate of itself to act as an efficient seal due to the looseness it develops by wear, nevertheless supplements the fluid seal in its function of excluding dust from passing out of the mixer.

As will be apparent from the above description, I have provided a mixing machine in which the connection between the rotating pan and stationary cover is effectively sealed against the passage of dust from the interior to the exterior of the mixing chamber so as to avoid the loss of material and to prevent contaminating the atmosphere in the vicinity of the apparatus. Obviously the present invention is not restricted to the particular embodiment herein shown and described as variations may be made therein without departing from the spirit of my invention.

I claim:

1. A mixing machine comprising an upright cylindrical mixing pan, a cover extending over and closing the top of the mixing pan, stirring means disposed within the mixing pan, means for imparting relative rotation between the mixing pan and cover, and a dust-tight seal between the mixing pan and the cover, said seal comprising a ring of substantial width supported upon the cover and having intermediate its edges a depending annular tongue and a companion ring supported upon the mixing pan adjacent its upper end having an annular channel intermediate its edges adapted to loosely receive said tongue, said rings being arranged in closely spaced relation and out of bearing contact, a viscous fluid filling the clearance space between the tongue and channel, and an annular packing member overlapping the clearance space between the rings upon the interior of the mixer.

2. A mixing machine comprising an upright cylindrical mixing pan, a cover extending over and closing the top of the mixing pan, stirring means disposed within the mixing pan, means for imparting relative rotation between the mixing pan and cover and a dust-tight seal between the mixing pan and the cover, said seal comprising a ring of substantial width fastened to the lower side of the cover and having intermediate its edges a depending tongue and a companion ring telescoped over and fastened to the upper end of the mixing pan and having a channel intermediate its edges adapted to loosely receive said tongue, said rings being arranged in closely spaced relation and the inner wall of said channel being of greater vertical height than the outer wall of the channel, a body of grease confined within the channel and filling the clearance space between the tongue and channel, an annular packing member supported upon one of said rings and overlapping the clearance space between the rings upon the interior of the mixer, and a passageway extending through one of said rings and communicating with the channel for the introduction of grease into the channel.

3. A mixing machine comprising an upright cylindrical mixing pan, a cover extending over and closing the top of the mixing pan, stirring means disposed within the mixing pan, means for imparting relative rotation between the mixing pan and cover, and a dust-tight seal between the mixing pan and the cover, said seal comprising a ring of substantial width supported upon the cover and having intermediate its edges a depending annular tongue and a companion ring supported upon the mixing pan adjacent its upper end having an annular channel intermediate its edges adapted to loosely receive said tongue, said rings being arranged in closely spaced relation and out of bearing contact, a viscous fluid filling the clearance space between the tongue and channel, an upwardly extending passageway through one of said rings communicating with the channel and opening to the outside of said ring for permitting the introduction of fluid into the channel, and an annular packing member overlapping the clearance space between the rings upon the interior of the mixer.

4. A mixing machine comprising an upright cylindrical mixing pan, a cover extending over and closing the top of the mixing pan, stirring means disposed within the mixing pan, means for imparting relative rotation between the mixing pan and cover, and a dust-tight seal between the mixing pan and the cover, said seal comprising a ring of substantial width supported upon the cover and having intermediate its edges a depending annular tongue and a companion ring supported upon the mixing pan adjacent its upper end having an annular channel intermediate its edges adapted to loosely receive said tongue, said rings being arranged in closely spaced relation and out of bearing contact and the outer wall of the channel being disposed at a lower elevation than its inner wall, a viscous fluid filling the clearance space between the tongue and channel, and an annular packing member overlapping the clearance space between the rings upon the interior of the mixer.

5. A mixing machine comprising an upright cylindrical mixing pan, a cover extending over and closing the top of the mixing pan, stirring means disposed within the mixing pan, means for imparting relative rotation between the mixing pan and cover, and a dust-tight seal between the mixing pan and the cover, said seal comprising a ring of substantial width supported upon the cover and having intermediate its edges a depending annular tongue and a companion ring supported upon the mixing pan adjacent its upper end having an annular channel intermediate its edges adapted to loosely receive said tongue, said rings being arranged in closely spaced relation and out of bearing contact and the outer wall of the channel being disposed at a lower elevation than its inner wall, a viscous fluid filling the clearance space between the tongue and channel, an upwardly extending passageway through one of said rings communicating with the channel and opening to the outside of said ring for permitting the introduction of fluid into the channel, and an annular packing member overlapping the clearance space between the rings upon the interior of the mixer.

JAMES P. MARTIN.